US006079968A

United States Patent [19]

Schmitz et al.

[11] Patent Number: 6,079,968

[45] Date of Patent: Jun. 27, 2000

[54] DEVICE FOR THE CONTROLLED SPRAYING OF PULVERULENT LUBRICANTS ONTO PUNCHES AND DIES OF TABLETING PRESSES

[75] Inventors: Guido Schmitz; Hans-Dieter Schmitz, both of Leverkusen; Peter Kurka, Langenfeld, all of Germany; Joachim Maasz, Morristown, N.J.

[73] Assignee: Bayer Aktiengesellschaft, Leverkusen, Germany

[21] Appl. No.: 08/968,783

[22] Filed: Nov. 12, 1997

[30] Foreign Application Priority Data

Nov. 14, 1996 [DE] Germany .......................... 196 47 089

[51] Int. Cl.[7] .......................... B29C 43/08; B29C 33/58

[52] U.S. Cl. .......................... 425/96; 425/100; 425/107; 425/135; 425/345

[58] Field of Search .......................... 425/90, 95, 96, 425/98, 100, 107, 231, 135, 139, 166, 345

[56] References Cited

U.S. PATENT DOCUMENTS

| | | | |
|---|---|---|---|
| 4,047,866 | 9/1977 | Shah | 425/107 |
| 4,388,343 | 6/1983 | Voss et al. | 427/14.1 |
| 4,707,309 | 11/1987 | Voss et al. | 264/12 |
| 4,892,133 | 1/1990 | Solignac | 164/452 |
| 5,186,956 | 2/1993 | Tanino et al. | 425/135 |
| 5,356,577 | 10/1994 | Boldis et al. | 264/40.7 |
| 5,365,577 | 11/1994 | Davis et al. | 379/96 |
| 5,609,908 | 3/1997 | Voss | 427/214 |
| 5,624,690 | 4/1997 | Boldis et al. | 425/100 |
| 5,643,630 | 7/1997 | Hinzpeter et al. | 427/133 |
| 5,700,492 | 12/1997 | Morimoto et al. | 425/100 |

FOREIGN PATENT DOCUMENTS

| | | | |
|---|---|---|---|
| 0262538 | 4/1988 | European Pat. Off. | B30B 11/00 |
| 0336197 | 10/1989 | European Pat. Off. | B05B 12/06 |
| 0379912 A2 | 8/1990 | European Pat. Off. | B30B 15/00 |
| 0379912 A3 | 8/1990 | European Pat. Off. | B30B 15/00 |
| 0676280A1 | 10/1995 | European Pat. Off. | B30B 15/00 |
| 3811260 | 10/1989 | Germany | B05D 1/02 |
| 3902293 | 8/1990 | Germany | B30B 11/08 |
| 4030539 A1 | 4/1992 | Germany | B05B 7/16 |
| 4030539 C2 | 4/1992 | Germany | B05B 7/16 |
| 4203273 | 8/1992 | Germany | B05B 7/02 |
| 19511272 | 10/1996 | Germany | B05B 7/02 |
| 2053787 | 2/1981 | United Kingdom | B30B 11/00 |
| 9213643 | 8/1992 | WIPO | B05B 7/10 |

*Primary Examiner*—Harold Pyon
*Assistant Examiner*—Mark A. Wentink
*Attorney, Agent, or Firm*—Norris McLaughlin & Marcus

[57] ABSTRACT

Device for spraying a pulverulent lubricant or release agent dispersed in an air stream onto the pressing tools in a tableting press, having at least one spray nozzle for applying the powder-containing air stream to the pressing tools, a suction system for sucking the excess residues of lubricant off the pressing tools and an air-jet injector for reproducibly loading the air stream with lubricant, wherein the pressing tools are connected to a sensor, which generates an output signal characteristic of the extent to which the lubricant is covering the surfaces of the pressing tools and controls the amount of air sucked off at the suction system, the loading of the air stream with the powder, or both.

13 Claims, 3 Drawing Sheets

DEVICE FOR THE CONTROLLED SPRAYING OF PULVERULENT LUBRICANTS ONTO PUNCHES AND DIES OF TABLETING PRESSES

The present invention relates to a device for spraying pulverulent lubricants onto punches and dies of tableting presses.

BACKGROUND OF THE INVENTION

The literature describes lubricant systems which spray the lubricant onto punches and dies of tableting presses both in liquid form (as a dispersion in alcoholic solvents) and in powder form.

EP 262 538 describes a system which conveys a lubricant out of a reservoir to a nozzle via a pump. In this system, the pump is synchronized with the tableting machine. The lubricant consists of an alcoholic lubricant dispersion, which for GMP (Good Manufacturing Practice) reasons is more problematical than the use of the pulverulent lubricant.

The same applies to the devices according to DE 42 03 273. The common feature of these devices is that a liquid lubricant dispersion having the abovementioned drawbacks is sprayed.

Furthermore, EP 0 336 197 describes the controlled delivery of metered amounts of finely divided solids using a venturi nozzle. Use is made here of a discontinuous control system for conveying the lubricant. Moreover, there is no control over the addition of lubricant. Furthermore, in this device the lubricant reservoir, the conveying system and the nozzle are positioned directly adjacent to the tableting press and for GMP reasons cannot be moved into another area.

SUMMARY OF THE INVENTION

The invention seeks to improve a device for spraying a pulverulent lubricant or release agent dispersed in an air stream onto the pressing tools in a tableting press. This device comprises at least one spray nozzle for applying the powder-containing air stream to the pressing tools, a suction system for sucking the excess residues of lubricant off the pressing tools and a metering device having an air-jet injector for reproducibly loading the air stream with the lubricant.

Starting from this device, the object is to improve the supply of lubricant to the tableting press in such a manner that adequate lubrication of the pressing tools with the pulverulent lubricant is always carried out even with critical tableting material which tends to cake and operating problems caused by tableting material caking on the punch surfaces are reliably avoided.

This object is achieved according to the invention in that the pressing tools of the tableting press are operatively connected to a sensor, which generates an output signal which is characteristic of the extent to which the lubricant is covering the surfaces of the pressing tools and controls the amount of air sucked off at the suction system and/or the loading of the air stream with the powder. Thus either the amount of air sucked off or the loading of the air stream with the powder is adjusted in such a manner that a sufficient covering of the pressing tool surfaces with the lubricant is ensured. However, it is also possible, and in many cases advantageous, if the two types of adjustment are combined with one another. This special feedback ensures a reproducibly settable, optimum lubrication of the pressing tools which meets the requirements and is independent of the operating state.

A suitable sensor is, for example, a force sensor which generates an output signal which is characteristic of the force required to eject the tablets from the pressing tools;

However, a sensor which comprises an optical reflection sensor for detecting the light reflected from the surface of the pressing tools is advantageously used. The action of this optical sensor is based on the fact that less light is reflected in the event of a more heavy covering of the punch surfaces by the pulverulent lubricant, so that the sensor signal decreases.

According to a preferred embodiment of the invention, the sensor is connected to a control circuit which, in the event of a change in the sensor output signal, adjusts the suction power of the suction system and thus the covering of the surfaces of the pressing tools with the lubricant so that the deviation of the sensor output signal from a predetermined desired value $S_0$ or $K_0$ is minimized. The suction power of the suction system is thus used as a control variable in order to adjust the covering with lubricant and thus the intensity and efficiency of the lubrication. This is because a lower level of suction results in a larger proportion of lubricant adhering to the press punch surfaces. By contrast, a stronger level of suction sucks off more powder, so that the covering becomes less.

If a force sensor is used as the sensor measuring the covering, the control system is designed such that the force sensor, in the event of the output signal increasing up to a limit value $K_1$, causes the suction system to reduce the suction power.

However, as already mentioned a reflection sensor is preferably used as the sensor measuring the covering. In this case, the control system is designed such that the reflection sensor, in the event of its output signal decreasing to a limit value $S_1$, causes the suction system to reduce the suction power.

A further development of the invention is characterized in that the output signal of the force sensor, in the event of the limit value $K_1$ being exceeded, or the output signal of the reflection sensor, in the event that it falls below the limit value $S_1$, causes the metering device to increase the metering of lubricant into the air stream flowing to the spray nozzle, until the signal falls back below the limit value $K_1$ or moves back above the limit value $S_1$. In this way, an operating state is taken into account in which product (tableting material) begins to settle on the punch surfaces and the sensor, despite a reduction in the suction of lubricant, signals a further increased tablet ejection force or (in the case of the optical sensor) a further reduced reflection. The need in this case to make the lubrication even more intensive can clearly not be achieved by a further reduction in the suction of lubricant. It is then only possible to return to the normal control state by loading the air stream more strongly with the pulverulent lubricant. The stronger loading is thus introduced as an auxiliary control variable when adjustment of the suction power is no longer sufficient to return the control variable, i.e. the sensor signal which is characteristic of the covering of the pressing tools with lubricant, to the desired value. As already mentioned, experience has shown that this situation arises when product settles on the surfaces of the pressing tools.

In the event that particularly high requirements are placed on the metering accuracy, it may be expedient to incorporate an additional control device, which interacts with the metering device, in order to ensure a high level of constancy of the loading of the conveying air stream with the lubricant.

A further important improvement to the invention consists in the fact that the spray nozzle for applying the lubricant to the pressing tools is incorporated in the feed shoe of the tableting press together with the suction device for removing the excess lubricant. If necessary, the scraper which is required to convey the ejected tablets away may likewise be attached to the feed shoe. This integrated, space-saving design has the advantage that existing tableting presses can readily be retrofitted with the new lubricant system.

The metering device for feeding the pulverulent lubricant into the conveying air stream generated by means of an injector expediently comprises a vertically disposed reservoir, which is provided with agitator arms and an agitator cage and its base has a discharge opening. A vibrating conveyor (shaker channel) arranged beneath the discharge opening of the reservoir advantageously serves to convey the discharged powder onwards into the air-jet injector.

The invention provides the following advantages:

The new controlled lubricant system ensures a reliable and operationally safe lubrication of the punch surfaces in the tableting machine even when tableting critical products which tend to cake. As a result, operational reliability and service life can be improved.

Since only a few additional components are required, and these can be integrated in the feed shoe of the tableting press, it is also possible without great difficulty to retrofit existing installations at relatively low cost. In particular, even with tableting presses with restricted space conditions in the feed-shoe region the advantages of external tablet lubrication can be realized.

The design principle of the lubricant system according to the invention allows a spatially separate positioning of the lubricant reservoir and of the pneumatic conveying device of the tableting press, so that the preconditions for operation which is in accordance with GMP are fulfilled.

BRIEF DESCRIPTION OF THE DRAWINGS

The invention is explained in more detail below with reference to an exemplary embodiment illustrated in the drawings, in which.

DETAILED DESCRIPTION

Figure 1:
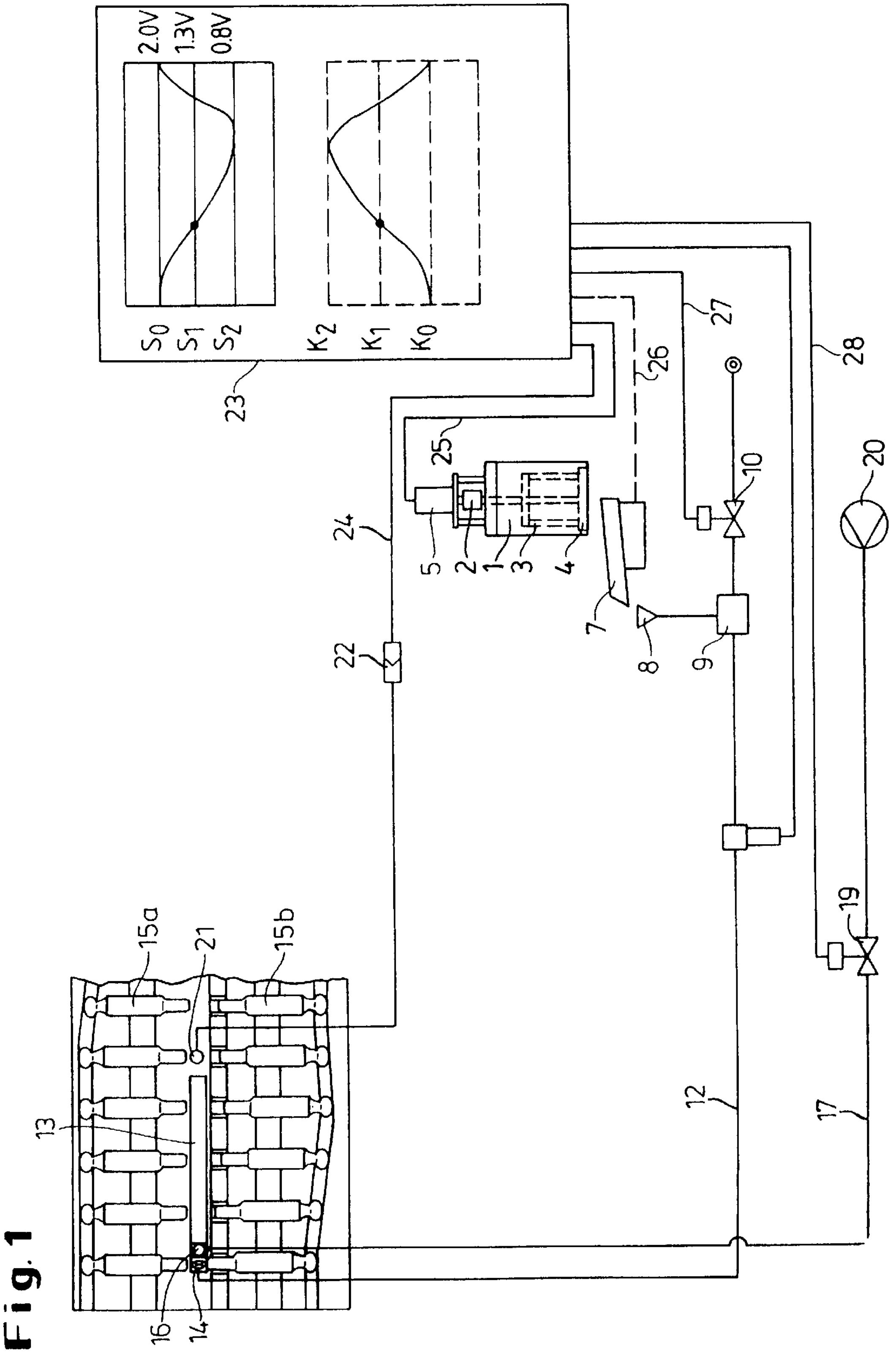
FIG. 1 shows the control circuit diagram for the addition of lubricant
Figure 2:
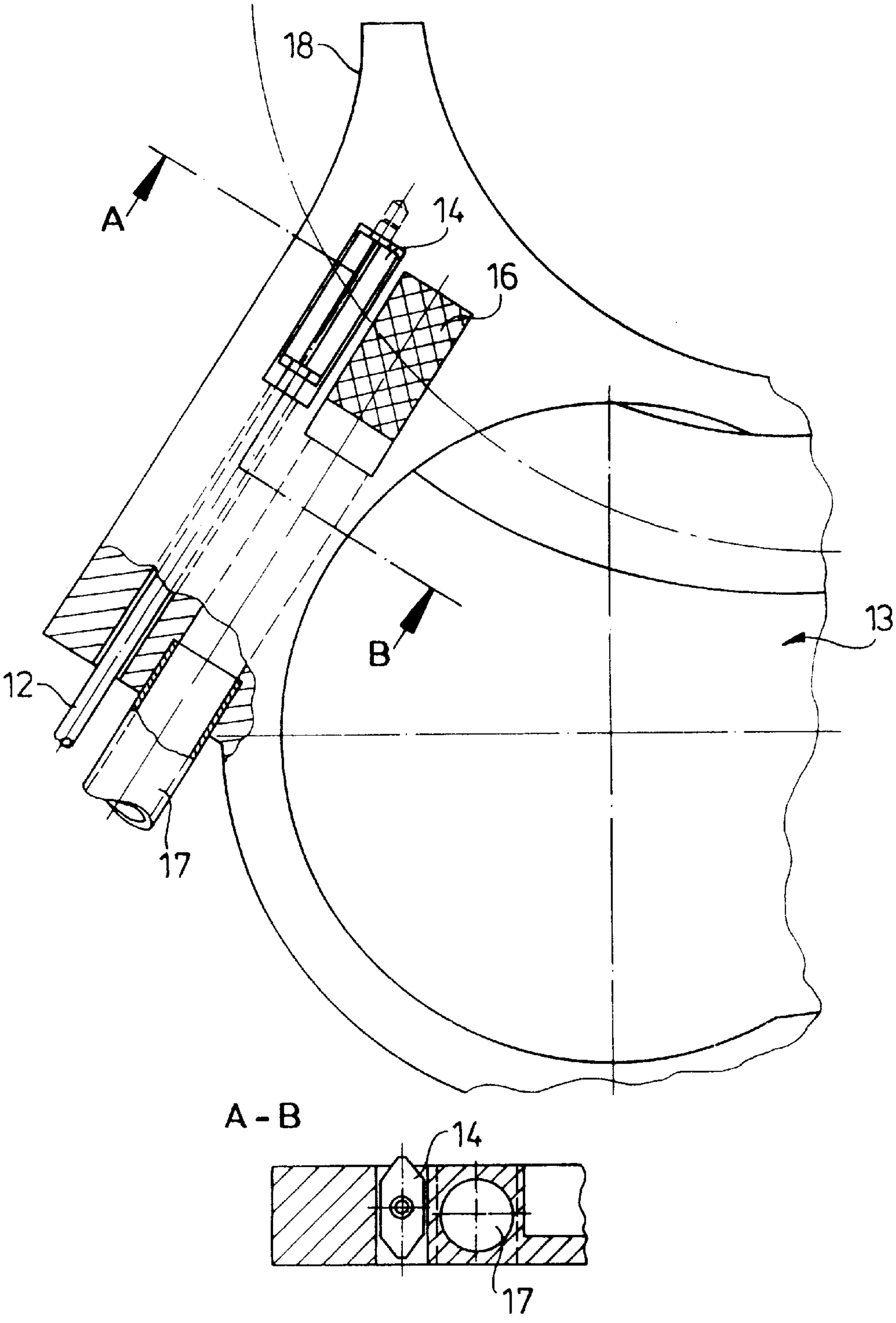
FIG. 2 shows a plan view of a modified feed shoe with the fittings belonging to the lubricant system.
Figure 3:
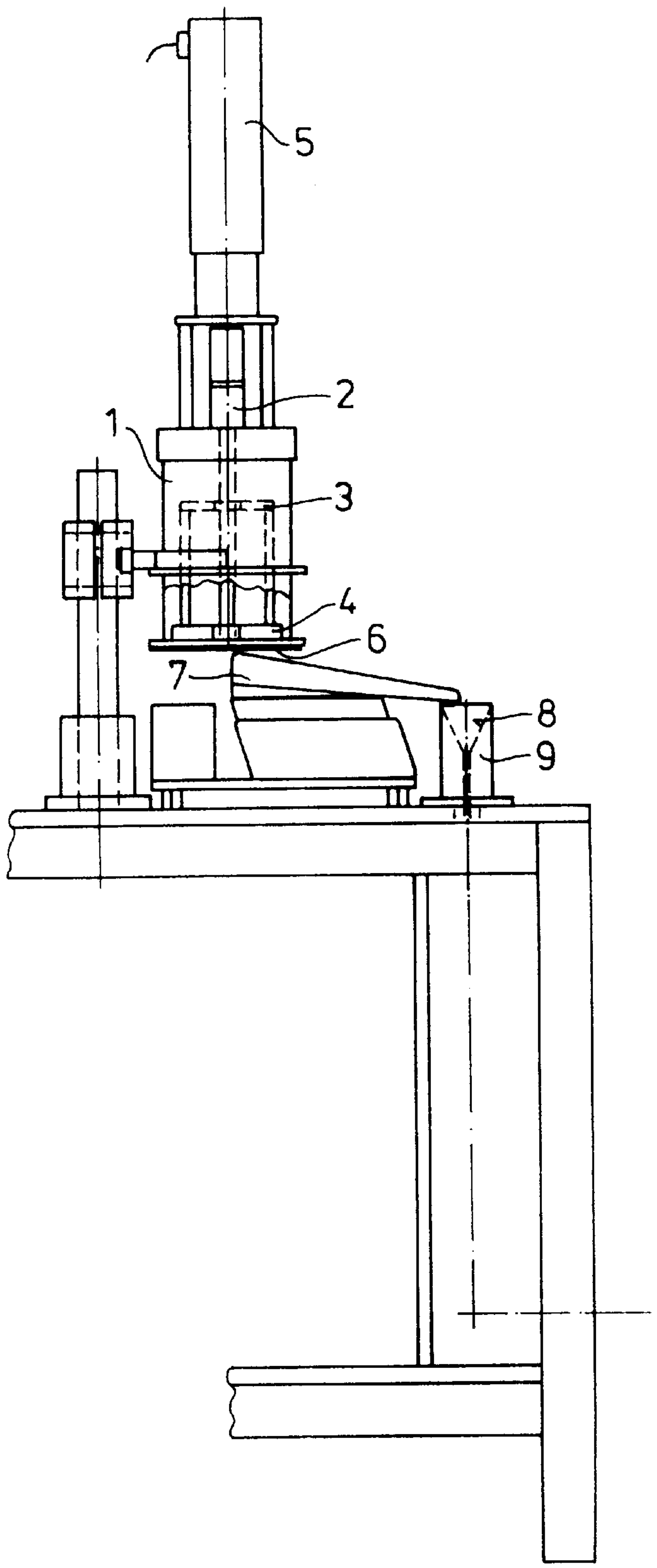
FIG. 3 shows the metering and conveying device for the pulverulent lubricant.

In accordance with FIG. 1 and FIG. 3, the pulverulent lubricant, e.g. magnesium stearate, is situated in a cylindrical reservoir 1. An agitator mechanism 2 with a cage-like agitator body 3 and agitator blades 4 is fitted in the reservoir 1. The agitator mechanism 2 is driven by a speed-controlled motor 5. The lubricant in the vessel is continuously loosened by the revolving agitator mechanism 2 and a uniform product stream trickles through the discharge opening 6 (cf. FIG. 3) at the base of the reservoir 1 onto a shaker channel 7 (vibrating conveyor) which is arranged beneath the reservoir and leads to the feed opening 8 of an air-jet injector 9. The air-jet injector 9 is connected to a compressed-air source via a valve 10. The valve 10 is used to control the amount of air and thus the conveying power of the air-jet injector 9. The pulverulent lubricant is sucked into the air-jet injector 9 and is conveyed through a flexible tube 12, which may be several meters long, to a spray nozzle 14 incorporated in the feed shoe 13 of a rotary tableting press (cf. FIG. 2).

The slot-like spray nozzle 14 divides the air jet which is carrying the lubricant in the direction of upper punch 15*a* and lower punch 15*b* of the tableting press. This design of nozzle makes it possible to spray the upper and lower punches and the die of the tableting press with the lubricant. A suction device 16 for removing the excess lubricant not adhering to the pressing tool surfaces is likewise incorporated in the feed shoe. This suction device comprises a conically widened suction opening, which is arranged behind the spray nozzle 14 in the running direction of the press punch, is likewise integrated in the feed shoe and is connected to a suction line 17 (cf. FIG. 1). Furthermore, the tablet scraper 18, which is required to divert the tablets into an ejection duct, is in this embodiment, for space-saving reasons, arranged on the feed shoe 13 and not, as is otherwise customary, directly on the tableting press. The suction line 17 is connected to a suction pump 20 via a control valve 19. The remotely adjustable control valve 19 can be used to vary the suction power at the opening of suction device 16. It has been found that the suction power represents a suitable control variable for controlling the covering of the press punch surfaces with the lubricant. The covering increases with decreasing suction power and, conversely, decreases with increasing suction power.

The covering of the press punch surfaces with the lubricant is measured with the aid of a reflection sensor 21, which is arranged behind the suction device 16, in the running direction of the tableting punches, to the side of the tableting press punches which move past. The reflection sensor 21 is a commercially available component in which the primary light and the measured light are supplied and retrieved via optical fibres. The measured light is converted photoelectrically into an electrical measurement signal which is inversely proportional to the covering with the lubricant. Thus the greater the covering, the lower the intensity of the light reflected from the punch surface and also the smaller the magnitude of the measurement signal. The measurement signal is amplified (measurement amplifier 22) and fed to a control unit 23, the functioning of which is described below:

The control unit 23 comprises an input for the measurement line 24 and four outputs for control lines. The control line 25 is connected to speed controlled motor 5, the control line 26 to the shaker channel 7, the control line 27 to the air-jet injector valve 10 and the control line 28 to the control valve 19 in the suction line 17. The normal operating state of the control unit 23 is characterized in that in the event of a decrease in the measurement signal at the reflection sensor 21, corresponding to an increase in the covering of the punch surface with lubricant, the suction power at the suction opening 16 is increased by opening the control valve 19 further via the control line 28 and, conversely, in the event of an increase in the reflection signal (corresponding to a decrease in the covering of lubricant) the control valve 19 is closed to a greater extent in order to reduce the suction power. Thus a low degree of lubrication (with a high level of suction) leads to a high measured value, while a high level of lubrication (with weak suction) leads to a small measured value. The valve 19 and thus the suction power are now adjusted by the control unit 23, so that the lubricant covering of the pressing tools is held at a predetermined desired value $S_0$, or the deviation from this desired value is minimized.

However, it has been found in practice that situations arise where experience has proven that the measurement signal does not rise after falling below a specific limit value $S_1$ despite an increase in the suction, but rather remains constant or even decreases still further. In this case, tableting material (product) has settled on the punch surface and increasing the lubricant covering by reducing the suction power is no longer sufficient to prevent caking of product. This means that adjusting the suction power no longer has the desired success, so that the control system is blocked and fails. However, the problem can be solved by means of an additional control system (dual control system), which in this case provides for a higher loading of the injector air stream with the lubricant. For this purpose, the control line 25 is used to increase the rotational speed of the speed controlled motor 5 and thus also the amount of lubricant metered into the air-jet injector 9 until the product accumulation on the punches disappears. The measured value then moves back above the limit value $S_1$, so that the control system can be returned to the normal control area, in which the suction power is again used as the control variable for the lubricant covering. If necessary, the control unit 23 can adjust the vibration frequency of the shaker channel 7 (via the control line 26) and the volumetric flow of conveying air into the air-jet injector 9 (via the valve 10 and the control line 27) to match the increased metering of lubricant.

Instead of the optical reflection sensor 21, it is also possible to use a force sensor, which measures the force necessary to eject the finished tablets from the die of the tableting press (ejection force). Such force sensors are already installed in most commercially available tableting presses. Use is made here of the functional relationship that the ejection force decreases with an increasing covering of lubricant and increases with a decreasing covering of lubricant. In a similar manner to the above-described control system based on the reflection sensor, the ejection force measured is compared with a preselected desired value $K_0$ and the suction power is adjusted so that the deviation from this desired value is again as low as possible. Here too, it is possible in turn to use the option of increasing the powder loading in the conveying air stream if, as experience has shown, changing the suction power is no longer sufficient to return to the originally set desired value $K_0$ for the ejection force after a limit value $K_1$ for the ejection force has been exceeded in the event of product caking on the punch surfaces.

One variant of the invention consists in not using the suction at the press punches as a control variable at all for adjusting the lubricant covering of the press punch surfaces, but rather using the powder loading of the injector air stream from the outset. In this case, the suction power is kept constant and only the metering rate for metering the lubricant into the injector air stream and, if appropriate, also the amount of injector air are adjusted in such a way that the difference between the actual value, measured using the force sensor or reflection sensor, of the lubricant covering and the desired value $K_0$ or $S_0$ is eliminated (minimized). However, this type of control system under certain circumstances results in a higher consumption of lubricant.

We claim:

1. Device for spraying a pulverulent lubricant or release agent dispersed in an air stream onto the pressing tools in a tableting press, comprising at least one spray nozzle (14) for applying the powder-containing air stream to the pressing tools, a suction system (16, 19, 20) for sucking the excess residues of lubricant off the pressing tools and a metering device (1, 2, 3, 4, 5, 6) having an air-jet injector (3) for reproducibly loading the air steam with the lubricant, wherein the pressing tools (15*a,* 15*b*) of the tableting press are operatively connected to a sensor, which generates an output signal which is characteristic of the extent to which the lubricant is covering the surfaces of the pressing tools and which is amplified and fed to a control unit (23), which provides an output to a controller which controls the amount of air sucked off at the suction system (16, 19, 20).

2. Device according to claim 1, wherein the sensor comprises a force sensor which generates an output signal which is characteristic of the force required to eject the tablets from the pressing tools.

3. Device according to claim 1, wherein the sensor comprises an optical reflection sensor for detecting the light reflected from the surface of the pressing tools.

4. Device according to claim 2, wherein the force sensor is connected to a control circuit (16, 17, 19, 23) which, in the event of a change in the sensor output signal, adjusts the suction power of the suction system (16, 19, 20) and thus the covering of the surfaces of the pressing tools with the lubricant so that the deviation of the force sensor output signal from a predetermined desired value is minimized.

5. Device according to claim 4, wherein the controller, in the event of the output signal of the force sensor increasing up to a limit value $K_1$, causes the suction system to reduce the suction power.

6. Device according to claim 3, wherein the optical reflection sensor is connected to a control circuit (16, 17, 19, 23) which, in the event of a change in the sensor output signal, adjusts the suction power of the suction system (16, 19, 20) and thus the covering of the surfaces of the pressing tools with the lubricant so that the deviation of the sensor output signal from a predetermined desired value is minimized.

7. Device according to claim 5, wherein the controller, in the event that the output signal of the force sensor exceeds the limit value $K_1$ causes the metering device (1, 2, 3, 4, 5, 6) to increase the metering of lubricant into the air stream, until the signal falls back below the limit value $K_1$.

8. Device according to claim 1, wherein a control system which keeps the metering rate for loading of the air stream constant is additionally provided.

9. Device according to claim 1, wherein the spray nozzle (14) for applying the lubricant to the pressing tools (15*a,* 15*b*) is incorporated in the feed shoe of the tableting press together with a scraper (18) for the tablets and a suction device (16) for removing the excess lubricant.

10. Device according to claim 1, wherein the metering device comprises a vertically disposed reservoir (1), which is provided with agitator arms (4) and an agitator cage (3) and at its base has a discharge opening (6), and wherein a vibrating conveyor (7) is arranged beneath the discharge opening (6) in order to convey the pulverulent lubricant trickling out of the reservoir (1) into the air-jet injector (9).

11. Device according to claim 6, wherein the controller, in the event the output signal of the optical reflection sensor decreases to a limit value $S_1$, causes the suction system (16, 19, 20) to increase the suction power.

12. Device according to claim 6, wherein the controller, in the event that the output signal of the optical reflection sensor falls below the limit value $S_1$, causes the metering device (1, 2, 3, 4, 5, 6) to increase the metering of lubricant into the air stream, until the signal falls back above the limit value $S_1$.

13. Device according to claim 1, wherein the control unit provides an output to a controller which controls the loading of the air stream with the powder.

* * * * *